United States Patent
Buck et al.

(10) Patent No.: US 8,116,522 B1
(45) Date of Patent: Feb. 14, 2012

(54) SHIP DETECTION SYSTEM AND METHOD FROM OVERHEAD IMAGES

(75) Inventors: Heidi Buck, San Diego, CA (US); Elan Sharghi, San Diego, CA (US); Chessa Guilas, San Diego, CA (US); Brian Schalcosky, San Diego, CA (US); John Stastny, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 842 days.

(21) Appl. No.: 12/197,421

(22) Filed: Aug. 25, 2008

(51) Int. Cl.
*G06K 9/00* (2006.01)
(52) U.S. Cl. ........................................................ 382/103
(58) Field of Classification Search .................. 382/103; 342/20, 25 B, 27, 90; 348/169
See application file for complete search history.

(56) References Cited

U.S. PATENT DOCUMENTS

| | | | |
|---|---|---|---|
| 4,101,891 A * | 7/1978 | Fletcher et al. ............. | 342/25 A |
| 4,809,066 A | 2/1989 | Leberl et al. | |
| 4,906,940 A * | 3/1990 | Greene et al. ................ | 382/100 |
| 5,612,901 A * | 3/1997 | Gallegos et al. .................. | 702/3 |
| 5,805,742 A | 9/1998 | Whitsitt | |
| 6,714,679 B1 | 3/2004 | Scola et al. | |
| 6,747,649 B1 * | 6/2004 | Sanz-Pastor et al. ......... | 345/428 |
| 6,952,178 B2 | 10/2005 | Kirscht | |
| 6,990,410 B2 | 1/2006 | Boright et al. | |
| 7,146,380 B2 | 12/2006 | Schaepe et al. | |
| 7,221,783 B2 | 5/2007 | Soderman | |
| 7,424,335 B2 * | 9/2008 | Swift .............................. | 700/98 |
| 2005/0013486 A1 | 1/2005 | Wiedemann et al. | |
| 2007/0269078 A1 * | 11/2007 | Lee ................................. | 382/103 |
| 2008/0063237 A1 * | 3/2008 | Rubenstein .................... | 382/103 |
| 2008/0301570 A1 * | 12/2008 | Milstead et al. .............. | 715/763 |

OTHER PUBLICATIONS

Tunaley, "Algorithms for ship detection and tracking using satellite imagery", Geoscience symposium, 2004.*
Mecocci et al. "Radar image processing for ship-traffic control", Image and Vision computing, 1995.*
Heidi Buck, Elan Sharghi, Keith Bromley, Chessa Guilas and Tommy Chheng, Ship Detection and Classification from Overhead Imagery, Published Paper, Applications of Digital Image Processing, Edited by Andrew G. Tescher, Proceedings of the SPIE, Oct. 2007, vol. 6696, p. 66961C, pp. 1-15.
Heidi Buck, Automated Imagery Analysis (AIA), Presentation, Mar. 18-20, 2008, 32 pages, SPIE Defense & Security Symposium 2008, Orlando, Florida.

* cited by examiner

*Primary Examiner* — Jason M Repko
*Assistant Examiner* — Shervin Nakhjavan
(74) *Attorney, Agent, or Firm* — Kyle Eppele; Arthur K. Samora (57) ABSTRACT

Methods for automatic detection of ships in overhead images of bodies of water are disclosed. The image is initially analyzed to determine if land is present, and the portions of the overhead image where land is present are masked and not processed further. The methods include the steps of chipping the unmasked portions of the overhead image into a series of tiles, discriminating and removing clouds from the tiles using two-dimensional Fourier transforms, and characterizing tile background noise from the water's surface. Different ship detection algorithms are used, according to the level of background noise detected. Detected ships are output into a format that is easily interpreted by the user. The formatted output can also include a confidence rating, or a calculation of the certainty that the detected object in an output file is actually a ship.

15 Claims, 8 Drawing Sheets

SHIP DETECTION SYSTEM AND METHOD FROM OVERHEAD IMAGES

FEDERALLY-SPONSORED RESEARCH AND DEVELOPMENT

This invention (Navy Case No. 99,165) is assigned to the United States Government and is available for licensing for commercial purposes. Licensing and technical inquires may be directed to the Office of Research and Technical Applications, Space and Naval Warfare Systems Center, San Diego, Code 2112, San Diego, Calif. 92152; voice (619) 553-2778; email T2@spawar.navy.mil.

BACKGROUND OF THE INVENTION

Vessel detection from overhead imagery is currently accomplished manually by human image analysts. The image analysts must scroll across groups of approximately 512 raster lines at a time. Once the end of the line is reached, the search continues across the next set of 512 raster lines directly below the previously-scrolled set. In each frame, the image analyst looks for vessels by eye. Such a task is time consuming and labor intensive since images can be thousands of pixels across and thousands of lines in length. The inclusion in such images of clouds, land, rough seas, etc. often hinders the manual search and makes the search even more tedious.

Automated tools for overhead imagery analysis are currently under development, but these tools either require too many user inputs or output too many false detects. For example, current automated cloud detection algorithms use images and data that contain wavelengths outside of the visible band. Since overhead imagery used in the process of concern is often within the visible band, the cloud detection algorithms from such automated tools are not applicable to an analysis of overhead imagery. As another example, there have been many attempts at filtering and rejecting noise in images containing ocean water with many breaks while still retaining pertinent ship information. One such technique is the Constant False Alarm Rate (CFAR) technique. The CFAR technique is an effective technique that is applied by examining smaller windows within an image and acquiring statistics around each window. Although this noise removal technique shows to be more effective as well as more efficient since noise is removed over the entire image without having to break the image into smaller pieces, this technique is not effective for images in the visible band.

In sum, prior art automated image processing algorithms that are geared for cloud detection/removal, noisy water rejection, wake detection/removal, and wisp detection/removal are based on processes that manipulate data from outside of the visible band. There still exists a vast amount of data, however, collected from sensors that operate only in the visible band.

In view of the above, there is a need in the art for an automated image analysis system and method that effectively detects vessels from overhead imagery containing data that is within the visible spectrum. The system and methods of the present invention provides such an overhead image analysis tool. These and other advantages of the invention, as well as additional inventive features, will be apparent from the description of the invention provided herein.

SUMMARY OF THE INVENTION

Embodiments of the present invention provide methods and computer-readable means for accomplishing methods that automatically detect ships in overhead images of bodies of water, coastlines, and ports using digital image processing algorithms. The methods include the steps of chipping the overhead image into a series of tiles, discriminating and removing clouds from the tiles, characterizing background noise that is due to the water surface from the image tiles, and analyzing the image once the tiling, cloud discrimination/removal and background characterization steps have been accomplished. The detected ships are output into a format that is easily interpreted by the user. The output can also include a confidence rating, or a calculation of the certainty that the detected object in an output file is actually a ship.

The image is initially analyzed to determine if land is present. To do this, the methods access a data base of land shoreline components worldwide and compare the accessed coordinates to coordinates that are located in the overhead image of interest. Regions in the overhead image where land is present are replaced with null values. To reduce processing time, this occurs before the overhead image is chipped into tiles.

For cloud discrimination and removal, a two-dimensional (2D) Fourier transform (FT) is performed on each respective image tile, and a signal to noise ratio (SNR) is calculated over each axis of the 2D FT. The radius of a contour around a center of the 2D FT is also measured. Visual images of clouds have certain characteristics that are identifiable by evaluating the SNR and the contour of the tile 2D FT. When the image tile 2D FT reveals that the tiles contains a cloud when the SNR is above a predetermined threshold or when the contour radius is above a radius threshold, the 2D FT can be manipulated to remove the cloud from the imagery, which facilitates the detection of ships that are on the water surface below the clouds.

Other embodiments of the methods include characterizing background noise from the visual image due to the water's surface. To do this, the water surface is classified as black texture (lower sea states) or gray texture (higher sea states) according to the intensity of the image tile pixels. Binary images of the detected object are then combined with inverse FT's to via logic operations; different logic operations are used, depending on whether the water surface has been classified as black texture or gray texture. The result is an image tile wherein background noise to due to the water's surface has been removed. In other embodiments of the present invention, the methods include the steps of removing the ships wake and determining the size and direction of the detected ships. To do this, differences in pixel intensity values between a bow and stern portion of a detected ship and the water background are measured. The existence of a wake is indicated when the differences in pixel intensity values fall below a predetermined value The methods output the detected ships in an .html format, which contains a listing of all ships that have been detected. Alternatively, a .kml file, or a file which is used as an overlay for a map and contains all detected ships, could be used, or a shape file, which is a file set of rectangles where each rectangle corresponds to a location of a vessel in the original image, could be used. As cited above, a confidence rating C is that the detected images of the ships are actually images of ships is calculated; when C is below 0.4, there is a low confidence that the detected object is ship. When the value of C is above 0.85, there is a high confidence that the output of the methods is actually a ship.

BRIEF DESCRIPTION OF THE DRAWINGS

The novel features of the present invention will be best understood from the accompanying drawings, taken in conjunction with the accompanying description, in which similarly-referenced characters refer to similarly referenced parts, and in which.

DETAILED DESCRIPTION OF THE EMBODIMENTS

Embodiments of the present invention provide an automatic target recognition software tool, system, and method geared specifically for ship detection from overhead Electro Optical/Infrared (EO/IR) images of open bodies of water, coastlines, and ports. Each image input can range from hundreds of megabytes in size to about four gigabytes in size. It should be recognized, however, that the methods described herein may have applicability in other areas or image analysis, and therefore the following description of a preferred operating functionality is provided by way of example, and not by way of limitation.

Figure 1:
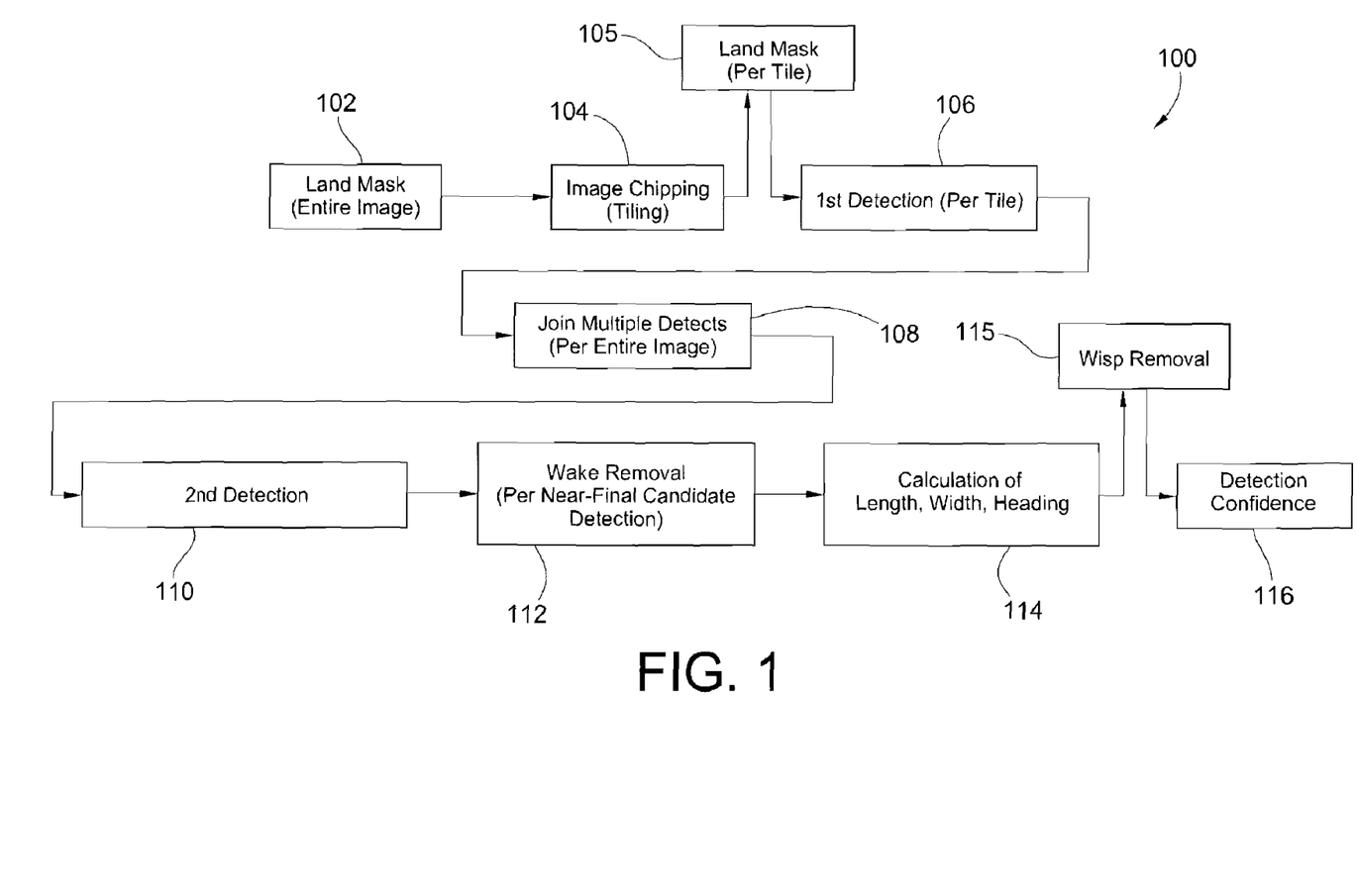
FIG. 1 is a simplified block diagram of an algorithmic sequence in accordance with one embodiment of the present invention.

In one embodiment in accordance with the teachings of the present invention, the methods and computer-readable means for accomplishing the methods includes a set of digital image processing algorithms that detect ships, contribute to the accuracy of those algorithms that detect ships, or provide specific information about each detected ship. Turning now to the drawings, and specifically FIG. 1, there is illustrated a block diagram of the algorithmic sequence 100 of an embodiment of the present invention. As illustrated by block 102, masking of land-covered areas in the image is performed. This can be accomplished by the following sub-steps: 1) Computing a reduced resolution image; 2) Creating a coarse edge map of the image; 3) Cleaning the binary image using a set of morphological operations; and, 4) Performing additional masking using the Word Vector Shoreline data file.

A typical image processed can range from a few hundred megabytes to a few gigabytes in size. Usually, such images are too large to load into a processor or computer memory, and as a result, a reduced resolution image must be computed, i.e., the image must be down-sampled before further processing is done. Image down-sampling is performed such that the length and width of the reduced resolution image does not exceed 2000 pixels.

The next sub-step in land masking step can be to compute a very coarse edge map of the down-sampled image. The edge map is computed on the reduced resolution image using Gabor odd filters at a single scale in eight varying directions. The edge image is created by summing the eight filtered images, and thresholding the result. There are two major advantages of using Gabor wavelets as an edge detector versus other existing and well known edge detectors, such as Canny or Sobel. First, the Gaussian component of the Gabor filter smoothes the image before performing edge detection, which reduces the number of false alarms (such as ocean glint) in our image from being picked up as an edge. The second reason is the Gabor odd filter has easy-to-adjust parameters, in order to change the edge thickness relative to the Canny or Sobel filters, or other computer filters known in the art.

The next sub-step in the land masking step can be to "clean" the binary detects using a set of morphological operations. The binary image is first dilated twice to connect small "blobs", and then eroded twice to return the blobs back to its original size while keeping newly connected blobs intact. Small blobs which do not meet a defined area threshold are then removed to prevent ships from accidentally being masked. Finally, hole-filling is performed on the image. For every pixel containing a high intensity value in the mask, the corresponding pixel in the image is set to zero.

Once the image has been cleaned as described above, the World Vector Shoreline data shapefile, which contains the coordinates for shorelines of the world, can be used to perform additional land masking for the processed image as a precautionary step. Once identified, the regions in the image where land is present are replaced with null or not a number (NaN) values. To do this, all vertices in the shapefile that fall within the image bounds are placed into a coordinate vector. If there are no vertices satisfying this condition, then the coordinate vector is returned empty, and the image is then tested for the presence of land by comparing the bounding coordinates of the image with the shapefile. If the image bounding coordinates are fully contained within a shape, then a specific flag is set to true. If the coordinate vector is empty and the flag is true, then there is no shoreline in the image and the image contains only land. If the coordinate vector is empty and the flag is false, then there is no shoreline in the images and the image contains only water. If neither of these conditions is satisfied, then the image is classified as containing both land and water (i.e. the image contains a shoreline).

Once it has been determined that the image contains both land and water (i.e. the image has a shoreline), the shape is then clipped to the bounds of the image. The clipped polygon becomes the mask that will be used to null the pixels of where the land is located. The shape is clipped to the image rectangle to improve processing time. To see this, suppose that the image bounds include the San Diego, Calif. area. If the shape that it is being used to mask the image is the United States, or worse the entire North American continent, the enormous amount of vertices would delay processing by several minutes or hours, depending on the capabilities of the machine processor for accomplishing the methods. A value of 0 is then assigned to all the pixels that are denoted as land. One additional land masking procedure needs to be performed, but on a tile by tile basis (rather than on the entire image) and is described in more detail below.

Once the initial land masking 102 is completed, the methods of the invention include the step of image chipping (tiling)

that have not been masked, or blacked out, as shown at block 104. In this process, the entire image is chipped into 512×512 pixel tiles, although the image may be chipped into larger or smaller tiles, according to user needs or the processing capabilities of the computer accomplishing the methods. Indeed, at the end of the pixel row or column, the tile size is variable; the number of remaining row pixels wide and the number of column pixels in length. The subsequent steps are performed on each tile as a sequence.

As indicated by block 105 in FIG. 1, additional land masking is performed on a per-tile basis. That is, to prevent the boundaries of the land-mask from being detected and classified as a ship, extra land-mask based measures are performed on each tile. A very sensitive Canny edge detector is used to detect the blacked-out land. The output of the edge detector is dilated to give a binary image that is high (white) in the water-bound areas. This image is inverted such that the land region is high (white) and the water-bound region is low (black). If the area of the land-bound region is greater than, e.g., 400 pixels, the tile is classified as having land. If there is land present, the land region is filled with a new intensity value to allow for a correct ocean texture classification (See step 120 in FIG. 2). The new intensity value is the statistical mode of the water-bound region. During the background characterization of the water surface as black texture or gray texture as described below (See block 122 and 124 of FIG. 2), any detect that occurs in or within a 100 pixel distance of the land region is ignored.

Once the land masking steps have been completed, an embodiment of the present invention proceeds to a first detection algorithm 106 that is performed on each tile of the chipped image. The process for this first detection algorithm 106 is illustrated in greater detail in FIG. 2, to which attention is now directed.

Figure 2:
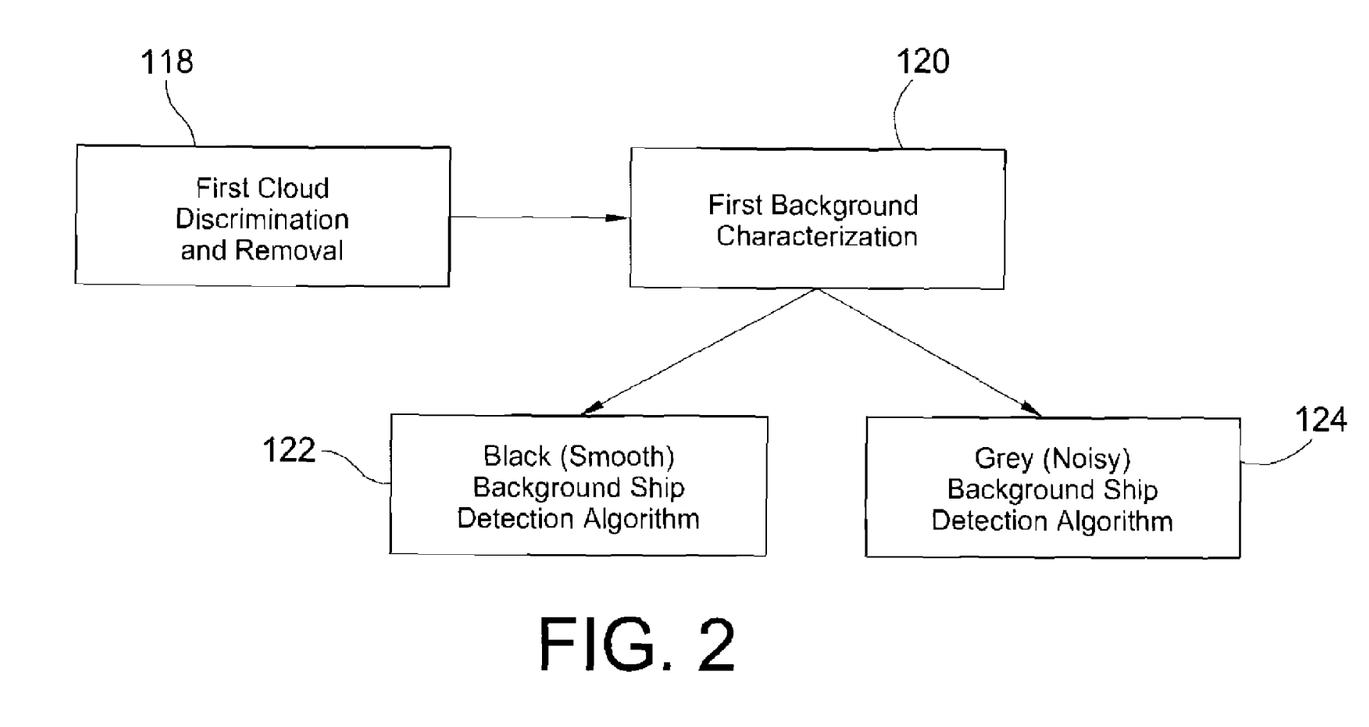
FIG. 2 is a simplified block diagram of an algorithmic sequence that describes the first detection step that is illustrated in FIG. 1 in greater detail.

Referring now to FIG. 2, the first detection algorithm proceeds with cloud discrimination and removal, as illustrated by block 118. To do this, a two-dimensional (2D) Fourier transform (FT) is taken of each image tile. The 2D FT is accomplished to take advantage of the characteristics that are inherent in 2D FT's of clouds in visual imagery. Specifically, in the frequency domain, there are two common features of an image containing a cloud. The first feature is a set of larger components along one or both of the center line axis or axes. Image of clouds tend to have this feature due to the smooth intensity transitions from high intensity (cloud) to low intensity (water) around the outer edges of the tile. Images that contain clouds near the outer edges of the tile have a sharp rise axially through the centers of the image transform. Most clouds have a cross appearance in the FT plot. If a cloud is located near only one edge of the tile, the transform is frequently seen to have only a straight line through the center of the plot.

To detect the axial feature, a simple signal to noise ratio (SNR) of the 2D FT is taken over each axis separately to determine if the image contains a cloud. The signal component is calculated by taking the average down the 0 spatial frequency axes of the plot, and the noise components are calculated by taking an average off to the side of each axis. Since the amplitude of the FT is on a log scale, the SNR is calculated by subtracting the noise component from the signal component. If the SNR is above a certain predetermined threshold (in this embodiment 10), the image is deemed as containing a cloud.

The second feature that clouds tend to exhibit is a large radial rise around the center of the transform. Clouds tend to have this feature due to low frequency components that extend spatially larger than anything else in the tile. There is less of an axial rise, yet a radial rise is much more apparent. Images without clouds have a single DC component located at the very center of the plot. To detect the radial feature, the radius of the contour around the center of the FT is measured. If the radius is above a threshold (in this embodiment one and eight tenths percent, 1.8%, of the length of the smallest edge), the image is classified as containing a cloud. If the tile has either of the two features, the tile is treated as a cloud tile and the cloud undergoes a removal process.

To remove the cloud from the tile, a cross mask that greatly resembles the cross feature exhibited by the cloud is created and used as a Fourier domain filter. This filter passes the components along the cross. A window based on the wave number is applied to the filter. After the filter is applied to the image, the inverse FT is performed to return the image to the spatial domain. The result is subtracted from the original image to yield a cloudless tile.

Once the cloud discrimination and removal function 118 has been completed, the methods of the present invention include the step of first characterization of the background noise that is due to the water's surface, as depicted by characterization block 120. The first step of the background characterization is to "stretch" each image tile. That is, the first detection algorithm applies a linear method of contrast stretching with a one percent (1%) clip on both ends of the histogram data for each tile. To do this, intensity values between 0 (black) and 255 (white) are assigned to each pixel, and a pixel intensity histogram is created for each image tile that describes the number of pixels having a particular pixel integer value. Next, two pixel values are determined: (1) The pixel integer value below which 1% of the pixels fall—the low limit; ands (2) The pixel value below which 99% of the pixel integer values fall—the high limit. Pixel intensity integer values that are below the low value and above the high value are discarded, and the back ground characterization algorithm is performed on the remaining pixels in the image tile.

There are occasions where minimum and maximum values of the stretch are too close together (there is not a lot of contrast within the tile of interest). When this is the case, applying the tile stretch as describe above will saturate the data for the image tile. To determine if this is the case, the methods of the present invention subtract the low limit from the high limit, and the result is divided by $2^N$, where N is the bit depth of the image, or the ability of the imaging system to distinguish between shades of gray (gray resolution). For this embodiment, N=8 and $2^N=256$. If the resulting ratio is less than, e.g., twenty percent (20%), or another predetermined percentage according to the user, then the higher limit is recalculated by taking the lower limit plus 20% of $2^N$.

Figure 4:
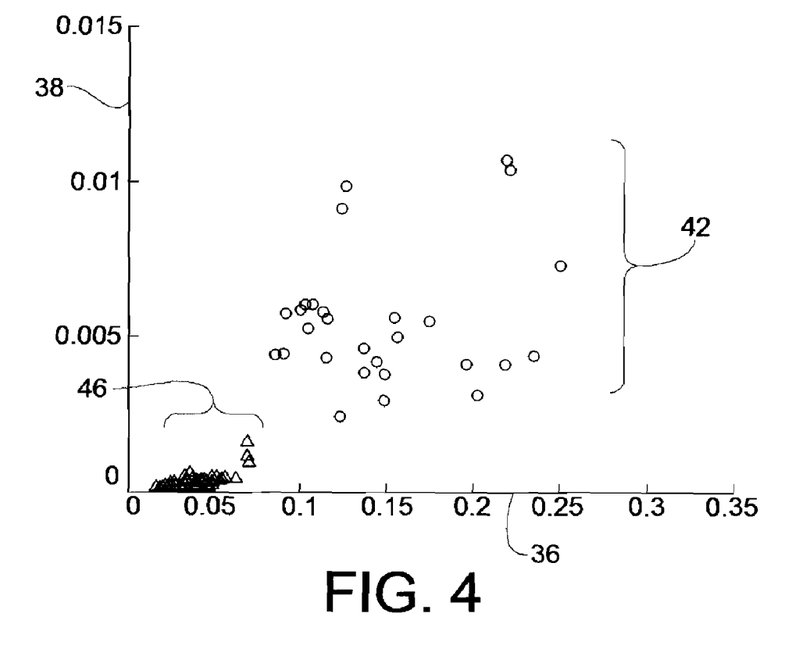
FIG. 4 is a graph of mean versus variances for calculated intensity for pixels, which is used in the background characterization step of FIGS. 2 and 3.

To classify the water surfaces, the mean and variance $\sigma^2(I)$ of the pixel intensity values are calculated for each of the pixels in the image tile. FIG. 4 is a graph of the mean (along x-axis 36) and variance (along y-axis 38) of the calculated values. As shown in FIG. 4, the calculated data points tend to segregate into two clusters 40, 42, which are designated black texture and grey texture, respectively. In one embodiment of the present invention, the following threshold values define the two categories of ocean texture, where I describes the image pixels: Black Texture $0 \leq \sigma^2(I) \leq 0.002$; and Grey Texture $0.002 < \sigma^2(I)$.

If the background characterization block 120 characterizes the image tile background as black texture, this means that the image tile is a relatively noise-free image and the black background detection algorithm depicted at functional block 122 and described below is performed. More specifically, a binary version of the tile is created by performing a threshold of the image at, e.g., 0.7 and filling any holes in the binary image. Stated differently, pixel intensities having a normalized integer value above a predetermined threshold (such as 0.7) are colored in as white, to fill "holes" in the image tile binary image. A second binary image is created by calculating the Canny edge of the original image. The two results are combined together by an OR operation. The OR operation ensures detection of small ships.

The next step is to dilate the output, and if the new connected pixels intensity values are above, e.g., 0.4, the segment is grown larger. To do this, the adjacent pixel intensity values are also checked. If the adjacent pixel intensity values are also greater than 0.4, the output is dilated by joining the adjacent pixels to form one detected object. This is repeated until either there are no more connected pixels greater than 0.4, or the segment has been dilated a predetermined number of times, e.g., 20 times. The output of this process is a binary image of all segments that are potential detected ships.

Figure 3:
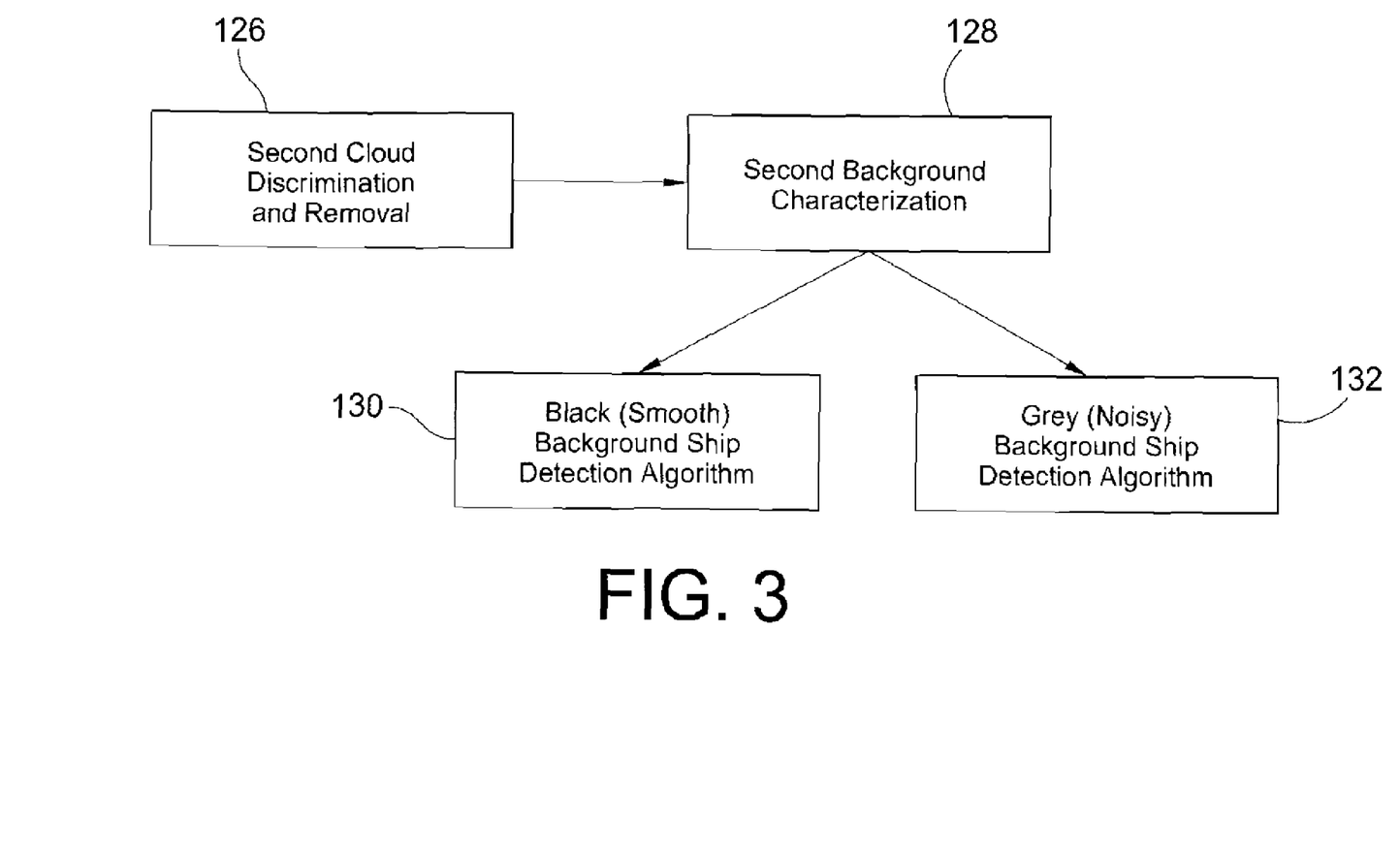
FIG. 3 is a simplified block diagram of an algorithmic sequence that describes the second detection step that is illustrated in FIG. 1 in greater detail.
Figure 5A:
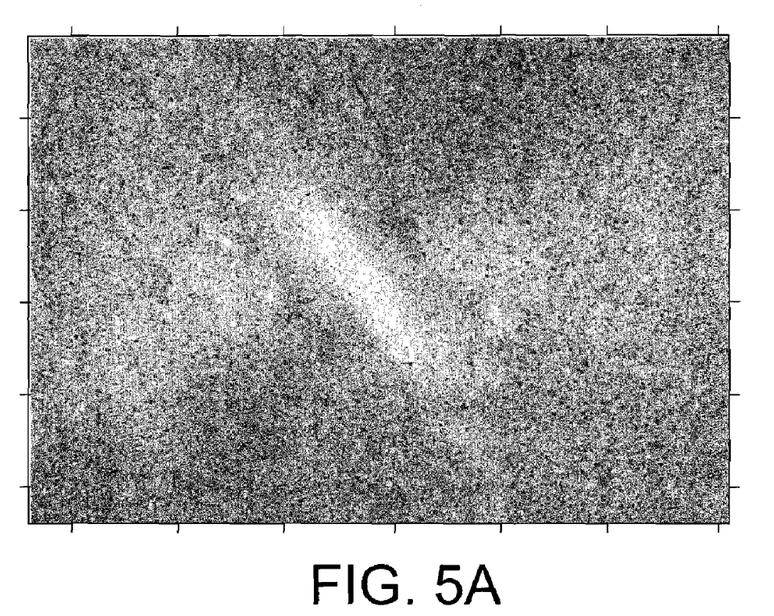
FIG. 5A is a photograph of a two-dimensional (2D) Fourier Transform (FT) of an image, which has been characterized as gray texture from the method depicted in FIGS. 2 and 3.
Figure 5B:
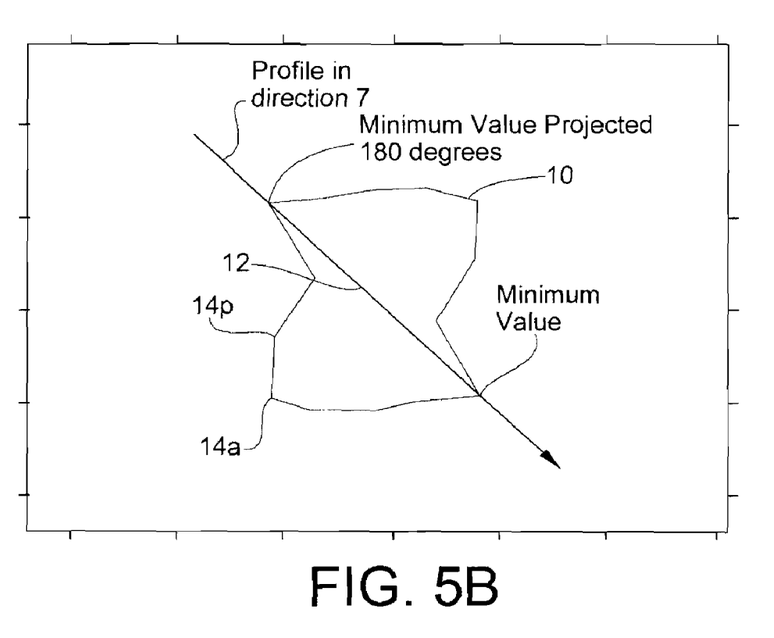
FIG. 5B is a lined drawing, which indicates the manner in which the 2D FT of gray texture in FIG. 5A is processed to yield a detected object.

To reduce noise and detect ships in an image tile that has been characterized as having gray texture, and as shown by block 124 in FIG. 3, a 2D FT is first applied to the image tile and its amplitude is plotted on a log scale. This 2D FT is shown in FIG. 5A. The higher frequency components of water are apparent in the FT of grey images. A slight null in amplitude acts as the boundary between ship components and water components. In an effort to filter out the water components, a customized filter is created for each image of interest. FIG. 5B illustrates an example of a customized filter that has been generated for the actual 2D FT shown in FIG. 5A.

From referring to FIGS. 5A and 5B, it can be seen that to create the outline of the custom filter, profiles of the 2A FT from FIG. 5A are taken in eight directions and an upper envelope 10, as shown in FIG. 5B. For each envelope 10, the minimum value within a given, e.g., 70 pixel, radius from the center is determined and projected 180 degrees about the center. This gives 16 points (point 14*a* is a representative point) on a 2D plane. The points are connected to form a polygon mask around the center to form the outer boundary of the filter. DC component 12 in FIG. 5B, or the center of the newly formed filter, tends to create ringing in an image, so it is zeroed out. To do this, a pixel radius defined by 0.005 multiplied by the length of shortest tile edge, forming the final filter. The resulting filter is applied to the 2D FT of the image.

An inverse FT is then applied and a threshold is applied to the resultant image. The exact threshold that is applied depends on the variance of the tile. The higher the variance is, the higher the threshold value. This creates a binary image. The binary image is dilated and combined to fill in gaps as described above. To reduce the number of false detections, a simple threshold applied to the original tile then an AND operation is performed on it and the binary image. The result is a ship that has been detected against a gray texture (a higher sea state) with the background noise due to the surface of the water having been filtered out.

After the first detection steps are described above are accomplished, the methods include the step of joining multiple detects from adjacent tiles, as illustrated by functional block 108 in FIG. 1. This step is accomplished to ensure that the ships that are partially located in adjacent tiles are not classified as two separate ships. Once multiple detects have been selectively joined as described above, a finer detection routine is then performed again on the portions of the tiles that have detected ships, and the previously-joined tiles. This illustrated by second detection functional block 110 in FIG. 1, and also by FIG. 3. From referring to FIG. 3, which describes the second detection block in greater detail, it can be seen that second cloud discrimination and second background characterization steps depicted by blocks 126 and 128, respectively, are accomplished. However, the second cloud discrimination and background characterization steps are accomplished according to slightly different algorithms than those described above for the first detection at functional block 106; the differences are recited below.

As indicated by block 126 in FIG. 3, a second cloud discrimination and removal step is accomplished. The second cloud discrimination and removal step 126 in FIG. 3 is similar to the first cloud discrimination and removal step accomplished indicated by block 118 in FIG. 2. That is, a 2D FT of the image tile is taken and SNR of the 2D FT is taken along each of axis of the FT, as described above. But for second cloud discrimination step 126, a cumulative distribution function (CDF) is generated for the image tile because it is more likely that an incorrect classification of an image tile as having a cloud will occur in the second cloud discrimination step, due to the ratio of the window size to the ship. Analyzing the CDF will help prevent false detection and will help distinguish between clouds and ships.

The CDF is accomplished by taking the histogram of the tile under test, and then calculating the cumulative distribution function (CDF) of this histogram. Images that contain clouds have a spread distribution function; clouds tend to have a CDF that slowly increases with smoother changes and eventually reaches the maximum value of 1, as indicated by curve 18 FIG. 6A. However, non-clouds have a CDF that reaches the maximum value of 1 very quickly with rapid changes as shown by curve 20 in FIG. 6B. The technique used to characterize the spread is based on linear regression curves 22, 24 that are fit to the distribution functions 18, 20, in FIGS. 6A and 6B, respectively. The y-intercept value given from the regression is generally very low for images with clouds.

Figure 6A:
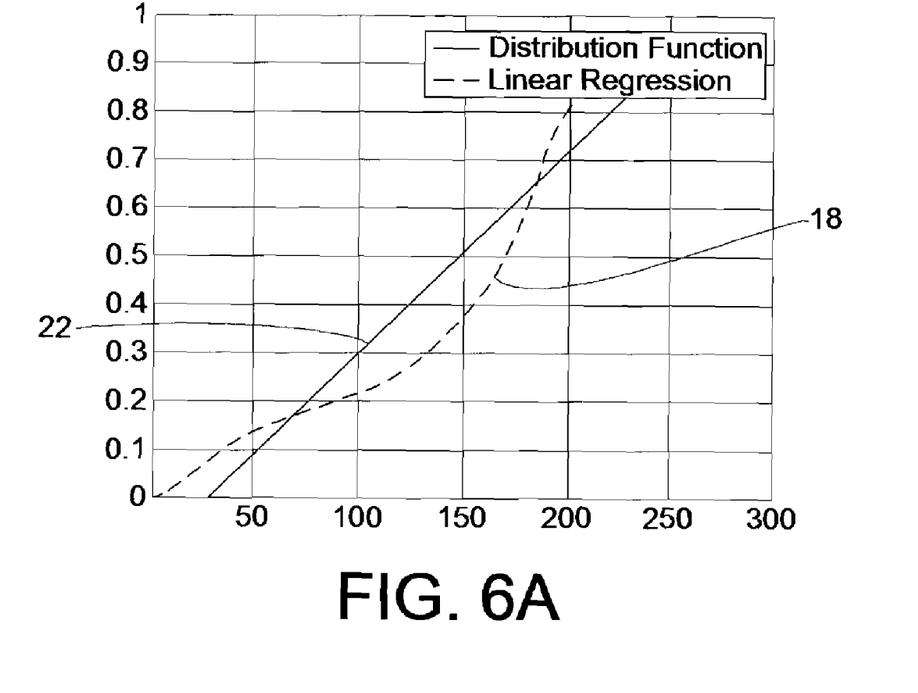
FIG. 6A is a linear regression graph of a cumulative distributive function that was generated while accomplishing the second cloud discrimination and removal step depicted in FIG. 3.
Figure 6B:
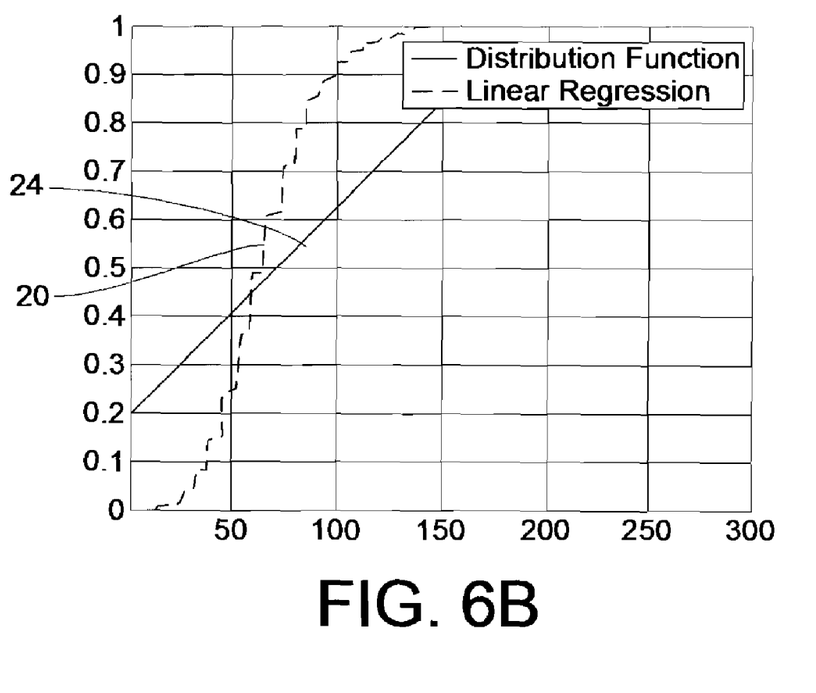
FIG. 6B is the same as FIG. 6A, but illustrates a cumulative distributive function for an image tile that does not contain a cloud; and, FIG. 7 is a plot of image intensity taken during the wake removal step depicted in FIG. 1.

If the 2D FT SNR, and the CDF of the 2D FT SNR both indicate that a cloud is present in the image tile, i.e., the tile contains both of these features, a windowed cross filter is applied to the Fourier domain tile. An inverse FT is performed to return the image to the spatial domain. The resulting image is subtracted from the original image to yield a cloud-removed tile.

Returning again to FIG. 3, the image undergoes a second background characterization step, as indicated by function block 128 in FIG. 3. For second background characterization step 128, for the regions of interest selectively determined by the user, i.e., those tiles that, based on the first detection step 106, are believed to contain detected ships, In second background characterization step 128, the image undergoes a simple noise removal step by convolving it with a 40×40 pixel Laplacian of Gaussian kernel with a standard deviation of 0.4. The filtered image is then thresholded by 0.3. Stated differently, pixels in the image tile that have an intensity greater than a threshold value of 0.3 are colored white to establish a binary image, and the largest segment is removed from the image. The threshold value of 0.3 may be adjusted up or down according to the desired sensitivity of the imaging system and/or resolution desires of the user. From the remaining segments, the ratio of high (white) pixels to total pixels is calculated. If this ratio is less than twelve percent (12%), or some other percentage selected by the user, the image region of interest is labeled as black texture, and the same black texture ship detection algorithm indicated by block 130 is used. Otherwise the image is labeled as gray texture and the gray texture ship detection algorithm that has been described above is used.

Once the second characterization step 128 has been accomplished and the image is characterized as having black texture or gray texture, the methods include the step of using the black background ship algorithm, as depicted in block 130, or the gray background ship detection algorithm, as depicted in block 132. Blocks 130 and 132 in FIG. 3 depict the same ship detection algorithms as those depicted by respective blocks 122 and 124 in FIG. 4; the only difference is the characterization step used to determine whether the tile included black texture or gray texture (i.e. first background characterization step 120 in FIG. 2 is different from second background characterization step 128 in FIG. 3). First and second black background detection algorithm (blocks 122 and 130) use the same algorithm to detect ships against a black texture background. Similarly, first and second gray background detection algorithms depicted 124 and 132 use the same algorithm; they are merely by different characterization steps 120 and 128, respectively.

Returning to FIG. 1, after the first and second detection steps 106, 110 have been accomplished, what remains is "near-final" detected ship candidates that the methods have deemed as ships. As depicted by functional block 112, the methods include a wake removal step is accomplished on these detected ships. If the detected areas of the ship contain no wake then there will be a sharp difference in intensity values between the bow or stern of the ship and the surrounding water. The goal of the wake detection and removal algorithm in block 112 is to determine if this sharp edge exists. If this edge does not exist, and the intensity value along the ship's horizontal axes instead decrease slowly to the values of the ocean background, then a wake exists and the stern of the ship can be located (for calculation of heading and length and width in block 114).

The first step to determine if a ship has a wake is to rotate the original ship image and the binarized detection image such that the major axis is horizontally aligned. The rotated binarized image is then used to find the left-most and right-most end points of the ship (probable bow and stern locations).

Next, the major axis of the rotated ship is calculated using the binarized image, and is overlaid on top of the original ship image. In one embodiment, an 11 row by 20 column window is then slid along the major axis of the ship. As the window is slid across the rotated ship image, the maximum value of 2D Fourier transform is computed from the values inside this window and plotted. Next, the upper envelope of the Fourier Transform plot is computed.

To determine which probable endpoint, calculated in the first step, belongs to the bow and which belongs to the stern, the absolute value of the slope of the Fourier Transform plot is calculated at the left and right end points of the ship. For the leftmost end index, the slope is calculated using a point ten pixels to the left of it, and for the rightmost end pixel the slope is calculated using the point ten pixels to the right of it. Calculating the slope in this fashion will ensure a measurement of the change in intensity from water to ship. The larger value determines the index of the bow of the ship. Looking at the ratio of the maximum slope to the negative slope, if the ratio is greater than a given number, e.g., 2 then it is determined that a wake is present. If this ratio is less than 2 it is determined that there is no wake present, and the probable bow and stern end points that were calculated in the first step can be used for length measurements and other calculations. Some further processing is needed to be performed to determine which point belongs associated with the bow and which belongs associated with the stern.

Figure 7:
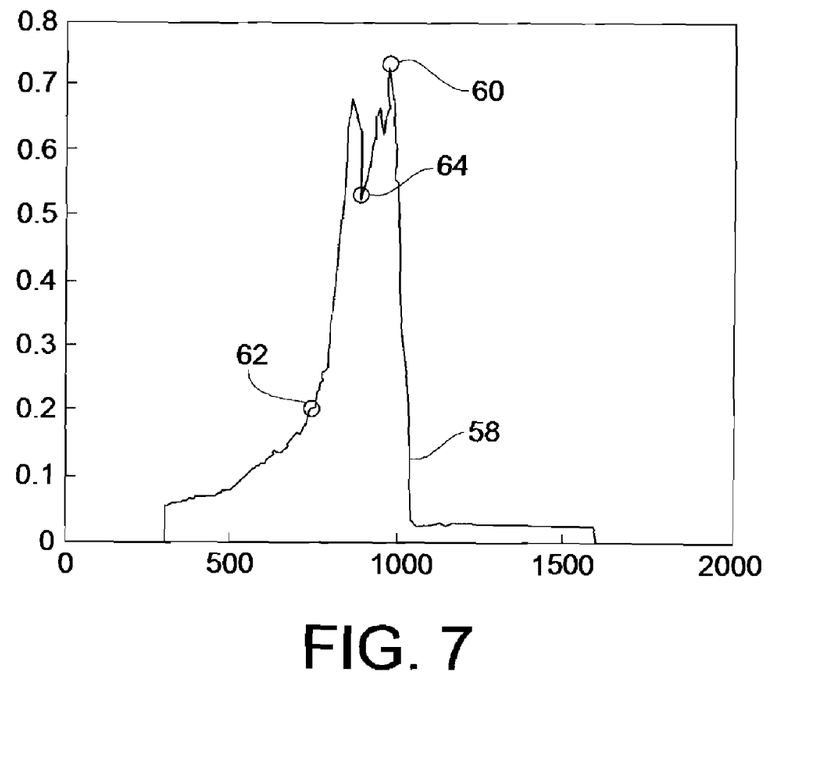

Given that a wake is present, the system needs to be able to remove the pixels belonging to the wake and find the exact location of the stern of the ship. To accomplish this, the system first determines the approximate width of the ship. This is done by measuring the width of the binarized detected image close to the bow of the ship. Using the width of the ship as a window size (creating a window that is N rows tall and 1 column wide, where N is the width of the ship), the intensity of the rotated ship image is computed by averaging the pixels in this window. The intensity plot is then averaged 15 points at a time, and then an envelope plot is computed from that average. This plot is illustrated in FIG. 7 by line 58. Also on this plot is noted the maximum value 60 of the envelope plot, and a lower threshold value 62, which was calculated by taking the mean of the envelope of the Fourier Transform. Forty percent of the length between these two points is the cutoff for the stern of the ship, in pixels; this point is indicated by reference character 64 in FIG. 7. This new value calculated in the previous step is now the estimated location of the stern of the ship (i.e., minus the wake. These bow and stern indexes (marked by points 60 and 64) are then used to identify a more accurate computed ship length, as indicated by functional block 114.

Block 114 also depicts that step of calculating a heading determination based on the wake. The heading of the ship is determined based on where the wake is located. The ship is headed in the direction opposite to where the wake is with respect to the location of the ship. To calculate the actual length and width, pixel counting is implemented along the major and minor axes of the detected ship, and then conversion from pixels to meters is performed using the metadata (viewing angle, ground sample distance) from the image.

The method includes the step of wisp removal, as indicated by block 115 in FIG. 1, to account for the phenomena that ships traveling at high speeds will produce long wakes, which appear in high resolution satellite imagery as bright wispy streaks. These long streaks present a major source of false positive detects, and consequently are a major source of wasted computational time. Block 115 utilizes an algorithm to reduce the number of false detects due to these long wakes or "wisps".

The first step in the removal of false detects due to wispy streaks is the characterization of each possible detected object according to its total area and its length to width ratio. Next, a pixel intensity histogram, or cumulative probability distribution function, of each detected object is determined. Based on the geometrical properties of each detected object (length, width, area), predetermined thresholds are set for the cumulative sum value within certain regions of the histogram. If the pixels intensities for the detected object are above these thresholds, the detected object is marked as a ship and passes through to the next stage of processing. If not, the detected object is marked as a wispy streak and discarded. The results of this algorithm show that a significant number of wispy streaks can be removed, which greatly reduces the false detection rate.

In one embodiment of the present invention, a detection confidence algorithm depicted by block 116 is also included. Specifically, the final output of binary images is analyzed to rank the confidence of detection. Each binary image is analyzed by looking at four features. The features include: standard deviation ($\sigma$), area (A), mean (m), and maximum intensity ($I_{max}$). The confidence level is determined by weighing each feature, assigning points to a range of feature values, and adding the new weighted values. The following equation describes confidence (C): $C=P_\sigma*W_\sigma+P_A*W_A+P_m*W_m+P_{Imax}*W_{Imax}$. A higher the C value corresponds to a higher confidence level. The point value assigned to each feature is based on the statistics of the binary detection. Table 1 summarizes the point and weight distribution for each feature:

TABLE 1

Point and Weight Distribution of Confidence Algorithm

| Feature | Weight (W) | Points (P) | Feature Value Range 1 | Feature Value Range 2 |
|---|---|---|---|---|
| Standard Deviation (σ) | 0.25 | 25 | 30-90 | — |
| | | 10 | 15-30 | 90-105 |
| | | 0 | Other | — |
| Area (A) | 0.25 | 25 | 1000+ | — |
| | | 15 | 150-1000 | — |
| | | 0 | 0-150 | — |
| Mean (m) | 0.25 | 25 | 80-170 | — |
| | | 15 | 50-80 | 170-200 |
| | | 0 | 0-50 | 200-255 |
| Maximum Intensity ($I_{max}$) | 0.25 | 25 | 150-255 | — |
| | | 15 | 70-150 | — |
| | | 0 | 0-70 | — |

Below is an example of how the detection confidence is determined.

Example:
Given From the Detection Statistics:
  Standard Deviation (σ)=50
  Area (A)=200
  Mean (m)=180
  Maximum Intensity ($I_{max}$)=170
Deduced From Table 1:
  $P_R=25$; $W_A=0.25$
  $P_A=15$; $W_A=0.25$
  $P_m=15$; $W_m=0.25$
  $P_{Imax}25$; $W_{Imax}=0.25$
Entering Deduced Values into Confidence Equation:
  C=(25)(0.25)+(15)(0.25)+(15)(0.25)+(25)(0.25)
  C=20
To normalize the value of C to a percentage value, we find highest possible point value of C is 25:
  $C_{max}=25$
The normalized Value of C is:

$$C_{norm} = C/C_{max}$$
$$= 20/25$$
$$= .80 \Rightarrow 80\%$$

So, there is an 80% (high) confidence that the detection is a ship.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It will be understood that many additional changes in the details, materials, steps and arrangement of parts, which have been herein described and illustrated to explain the nature of the invention, may be made by those skilled in the art within the principal and scope of the invention as expressed in the appended claims.

What is claimed is:

1. A method for processing an overhead image of a body of water for detection of ships, said overhead image having image coordinates, said method comprising the steps of:
   A) chipping the overhead image into image tiles;
   B) discriminating clouds from the image tiles;
   C) removing clouds from the image tiles;
   D) characterizing background noise due to said body of water's surface from the image tiles;
   E) selectively analyzing image tiles to confirm detection of a ship according to said background characterization;
   F) outputting a listing of said ships;
   G) analyzing the overhead image to determine if land is present therein, said step G) further comprising the steps of;
   G1) accessing a database of all land shoreline coordinates worldwide;
   G2) comparing of said land shoreline coordinates to said image coordinates to determine whether there is land located within the image;
   G3) mapping the land shoreline coordinates to said image coordinates;
   H) masking land-covered areas of the overhead image; and, said steps G) and H) being accomplished prior to step A).

2. The method of claim 1 wherein said step H) further comprises the step of:
   H1) replacing regions in the image where land is present with null values.

3. The method of claim 2, wherein the step H) further comprises the steps of:
   H2) applying a Canny edge detector to detect land-covered areas masked prior to the step of chipping on the image tiles;
   H3) dilating an output of the Canny edge detector to create a binary image;
   H4) inverting the binary image to identify regions of land in the binary image; and,
   H5) filling the regions of land with a new intensity value equivalent to a statistical mode of a water-bound region.

4. The method of claim 1, further comprising the steps of:
- I) determining if the detected ship has a wake associated therewith; and
- J) removing said wake from said image.

5. The method of claim 4, wherein the step I) further comprises the steps of:
- I1) analyzing differences in pixel intensity values between a bow portion and a stern portion of said ship and said water, and,
- I2) indicating that existence of a wake when said differences in pixel intensity values fall below a predetermined value.

6. The method of claim 1, wherein said step F) further comprises the step of:
- F1) assigning a detection confidence value to each detected ship.

7. The method of claim 1, wherein step B) further comprises the steps of:
- B1) performing a two-dimensional (2D) Fourier transform (FT) on each respective said image tile;
- B2) calculating a signal to noise ratio (SNR) over each axis of said 2D FT;
- B3) measuring a radius of a contour around a center of said 2D FT; and,
- B4) identifying the image tile to contain a cloud when the SNR is above a predetermined threshold or when the radius is above a radius threshold.

8. The method of claim 7, further comprising the steps of:
- B5) generating a distribution function of the tile SNR; and,
- B6) calculating a linear regression of the distribution function; and
- B7) identifying the image tile to contain a cloud when the linear regression slope is below a predetermined value.

9. The method of claim 1, wherein step D) further comprises the steps of:
- D1) calculating a mean and variance $\sigma^2$ (I) of pixel intensity values of the image tiles;
- D2) classifying the background type to be black texture when $0 \leq \sigma^2(I) \leq 0.002$; and,
- D3) classifying the background type to be grey texture when $0.002 < \sigma^2(I)$.

10. The method of claim 9 wherein said background type is classified as black texture, and further comprising the steps of:
- D9) creating a first binary version of the image tile by thresholding the image tile by a predetermined value;
- D10) creating a second binary version of the image tile by calculating a Canny edge of the image tile; and
- D11) combining the first binary version and the second binary version by an OR operation.

11. The method of claim 9 wherein said background type is classified as grey texture, and further comprising the steps of:
- D12) performing a 2D Fourier transform (FT) on the image tile;
- D13) plotting an amplitude of the FT on a log scale;
- D14) creating a custom filter to filter out water components of the FT;
- D15) applying the custom filter to the FT;
- D16) applying an inverse FT to the filtered FT;
- D17) thresholding an output of the step of applying the inverse FT to create a binary image;
- D18) applying a threshold on the image tile; and,
- D19) combining the output of the step of applying the threshold on the image tile and the binary image using an AND operation.

12. The method of claim 1, wherein step D) further comprises the steps of:
- D4) convolving the image tile with a predefined size Laplacian of Gaussian kernel with a predetermined standard deviation;
- D5) thresholding the convolved image by a predetermined number;

removing a largest segment;
- D6) calculating a ratio of detected pixels to total pixels;
- D7) classifying the background type as black texture when the ratio is less than a predetermined threshold; and,
- D8) classifying the background type as grey texture when the ratio is not less than the predetermined threshold.

13. A method of detecting ships from nadir panchromatic electro-optical imagery, comprising the steps of:
- A) masking the nadir panchromatic electro-optical imagery to remove land images therefrom;
- B) chipping the nadir panchromatic electro-optical imagery to form a plurality of image tiles;
- C) analyzing each of the image tiles to identify possible detects of ship images;
- D) selectively joining multiple detects identified by the step C) to form joined candidate detects when said detects are in adjacent tiles;
- E) analyzing said joined candidate detects from said step D) to identify near-final candidate detects;
- F) removing wisps for the near-final candidate detects to identify images of said detects in the nadir panchromatic electro-optical imagery; and,
- G) outputting said images to a file.

14. The method of claim 13, further comprising the step of:
- H) processing the images of the ships to determine length, width, and heading, said step H) occurring after said step F) and before said step G).

15. The method of claim 13, further comprising the step of:
- I) calculating a confidence rating that the images of the ships are actually images of ships.

* * * * *